United States Patent [19]

Hohmann et al.

[11] Patent Number: 5,209,527
[45] Date of Patent: May 11, 1993

[54] HOSE COUPLING

[75] Inventors: Ralf Hohmann; Ralf Spors, both of Bruchköbel; Gerhard Winterstein, Bad Vilbel, all of Fed. Rep. of Germany

[73] Assignee: Rasmussen GmbH, Maintal, Fed. Rep. of Germany

[21] Appl. No.: 788,822

[22] Filed: Nov. 7, 1991

[30] Foreign Application Priority Data

Nov. 23, 1990 [DE] Fed. Rep. of Germany ....... 4037306

[51] Int. Cl.$^5$ ............................................. F16L 33/20
[52] U.S. Cl. ...................................... 285/242; 285/39; 285/258; 285/331; 285/921
[58] Field of Search ............... 285/256, 259, 331, 319, 285/921, 242, 39, 258

[56] References Cited

U.S. PATENT DOCUMENTS

| 4,635,973 | 1/1987 | Sauer | 285/256 X |
| 4,753,459 | 6/1988 | Potier | 285/253 X |
| 4,929,002 | 5/1990 | Sauer | 285/94 |
| 5,044,675 | 9/1991 | Sauer | 285/256 |

FOREIGN PATENT DOCUMENTS

| 3813192 | 4/1990 | Fed. Rep. of Germany . |
| 534235 | 3/1941 | United Kingdom ................ 285/256 |

*Primary Examiner*—Dave W. Arola
*Attorney, Agent, or Firm*—Peter K. Kontler

[57] ABSTRACT

A hose coupling wherein a tubular connector has a first portion with an internal annular wall and an internal annular protuberance, and a cylindrical second portion. The protuberance is located between the wall and the second portion, and the first portion has axially extending elastic arms with pallets which can engage an external rib of a pipe when the terminal portion of such pipe is introduced into the first portion. A thin-walled metallic sleeve has a larger-diameter first section with a free end which is receivable in an annular socket of the wall after having passed within and beyond the protuberance upon entering through the open end of the second portion of the connector. At such time, the first section deforms and/or is deformed by the protuberance. The terminal portion of a hose is thereupon introduced between a smaller-diameter second section of the sleeve and the second portion of the connector before the second section is deformed from within to clamp the hose against the internal surface of the second portion of the connector. A sealing ring is confined and deformed between the internal surface of the first section of the sleeve and the peripheral surface of terminal portion of the pipe when such terminal portion is inserted into the connector.

10 Claims, 1 Drawing Sheet

HOSE COUPLING

BACKGROUND OF THE INVENTION

The invention relates to coupling devices in general, and more particularly to improvements in coupling devices of the type which can be used with advantage as a means for establishing separable leakproof connections between the terminal portions of pipes, hoses, tubes and/or other tubular components. Still more particularly, the invention relates to improvements in devices which can be utilized with advantage as so-called hose couplings, e.g., under the hoods of motor vehicles and elsewhere.

Commonly owned German Pat. No. 38 13 192 granted Apr. 12, 1990 to Sauer discloses a hose coupling wherein the terminal portion of the hose is sealingly clamped between the internal surface of a tubular connector and the external surface of a metallic sleeve. The pipe or tube to which the hose is to be coupled has an external retaining rib which is engageable by deformable arms of the connector. To this end, a portion of the connector is introduced into the terminal portion of the pipe or tube and the latter deforms a sealing ring which is placed between its internal surface and the external surface of an exposed portion of the sleeve, namely a portion which extends from the connector. The sleeve must be inserted into the connector from one end, and the terminal portion of the hose must be inserted into the connector from the other end. Such assembly of the sleeve with the connector and with the hose is followed by the provision of one or more corrugations in the internal surface of the sleeve so that the terminal portion of the hose is sealingly clamped between the sleeve and the connector. The sleeve has at least one external shoulder which abuts a radially inwardly extending collar at one axial end of the connector. This prevents the hose from drawing the entire sleeve into the interior of the connector. The patented hose coupling is designed to ensure that the connection between the connector and the terminal portion of the hose can stand pronounced axial separating stresses.

A drawback of the patented hose coupling is that the terminal portion of the hose and the sleeve cannot be introduced into the connector through the same axial end of the connector. This renders it necessary to introduce the sleeve into the terminal portion of the pipe or tube when the assembly of the coupling with the hose and with the pipe or tube is completed. Consequently, a portion of the path for the flow of a fluid from or into the terminal portion of the tube or pipe is taken up by at least one part of the patented coupling.

OBJECTS OF THE INVENTION

An object of the invention is to provide a novel and improved device which can be utilized as a hose coupling and is simpler, more compact and more reliable than heretofore known hose couplings.

Another object of the invention is to provide a coupling device which is constructed and assembled in such a way that its sleeve as well as a terminal portion of a hose or another tubular component can be introduced through one and the same end of the connector.

A further object of the invention is to provide a coupling device wherein the parts need not extend well beyond the peripheral surfaces of the tubular components which are being coupled to each other.

An additional object of the invention is to provide a novel and improved connector for use in the above outlined coupling device.

Still another object of the invention is to provide a novel and improved sleeve for use in the above outlined coupling device.

A further object of the invention is to provide a novel and improved method of dimensioning and assembling or separating the connector and the sleeve of the above outlined coupling device.

Another object of the invention is to provide a coupling device which can reliably prevent accidental separation of the interconnected tubular components from each other.

An additional object of the invention is to provide the above outlined coupling device with novel and improved means for disengaging its connector from one of the tubular components.

A further object of the invention is to provide a coupling device which can be used as a superior substitute for existing hose couplings and the like.

Still another object of the invention is to provide a coupling device which can establish a reliable sealing engagement with the terminal portions of the tubular components to be separably but sealingly secured to each other.

An additional object of the invention is to provide a novel and improved mode of confining one or more O-rings or other sealing elements in a coupling device of the above outlined character.

SUMMARY OF THE INVENTION

The invention is embodied in a device for separably coupling a terminal portion of a first tubular component (e.g., the nipple at one end of a pipe) with a terminal portion of a second tubular component (the second component can constitute an elastically deformable hose). The improved coupling device comprises a tubular connector having a first portion for reception of the terminal portion of the first component and a second portion for reception of the terminal portion of the second component. The first portion of the connector has an annular internal wall which is engageable with the terminal portion of the first component and is provided with an annular socket having an open end facing the second portion of the connector. The coupling device further comprises a sleeve having a smaller-diameter first section which is receivable in the terminal portion of the second component and a larger diameter second section having a free end which is receivable in the socket after having passed through the second portion of the connector. The connector and the sleeve define an annular compartment which is surrounded by the second section of the sleeve and is adjacent the wall when the free end of the second section is received in the socket. The coupling device also comprises at least one annular sealing element (e.g., an O-ring) which is receivable in the compartment to sealingly engage the sleeve and/or the wall as well as the terminal portion of the first component when the terminal portion of the first component is received in the connector.

The first portion of the connector is preferably provided with an annular internal protuberance which is spaced apart from the open end of the socket in a direction toward the second portion of the connector and has a predetermined inner diameter. The second section of the sleeve has an outer diameter which is greater than the inner diameter so that the protuberance and/or the second section of the sleeve undergoes deformation during introduction of the free end of the second section of the sleeve into the socket, i.e., while the second section of the sleeve passes through the protuberance of the connector. The two sections of the sleeve preferably define an external shoulder which is located between the protuberance and the wall when the free end of the second section of the sleeve is received in the socket, i.e, the protuberance and/or the second section of the sleeve need not be deformed when the sleeve is properly received in the connector but such deformation will take place during introduction of the sleeve into as well as during extraction of the sleeve from the connector.

The wall of the connector can be provided with a conical guide face at the open end of the socket to facilitate introduction of the free end of the second section of the sleeve into the socket. Furthermore, the free end of the second section of the sleeve can be provided with a conical external surface which rides over the protuberance during the initial stage of advancement of the second section of the sleeve through the protuberance in a direction to advance the free end of the second section toward and into the socket.

At least the first portion of the connector can be made of an at least slightly elastomeric material so that the protuberance can undergo elastic deformation during engagement by the second section of the sleeve.

At least the first section of the sleeve can be made of a ductile material (e.g., a metallic sheet material) so that the first section can be deformed from within upon reception of the terminal portion of the second component. Such deformation can involve the making of one or more corrugations to ensure that the terminal portion of the second component is reliably (particularly sealingly) confined between the second portion of the connector and the first section of the sleeve.

The improved device can be used to separably couple first and second tubular components of the type wherein the first component has an external retainer, e.g., a retainer having a shoulder which faces away from the terminal portion of the first component. The first portion of the connector then preferably comprises at least one flexible (preferably elastic) arm or extension which engages the retainer when the terminal portion of the first component is received in the connector. The at least one extension or arm of the first portion of the connector extends in a direction away from the second portion of the connector and is preferably provided with an inwardly extending pallet (e.g., in the form of a tooth) which engages the shoulder of the retainer when the terminal portion of the first component is properly received in the connector.

The coupling device can be further provided with means for disengaging the at least one extension or arm from the retainer of the first component preparatory to withdrawal of the terminal portion of the first component from the connector. The disengaging means can include a deformable or non-deformable ring which is rigid with the at least one arm or is slidable along the exterior of the first component between the retainer and the terminal portion of the first component when such terminal portion is properly received in the connector.

The novel features which are considered as characteristic of the invention are set forth in particular in the appended claims. The improved coupling device itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
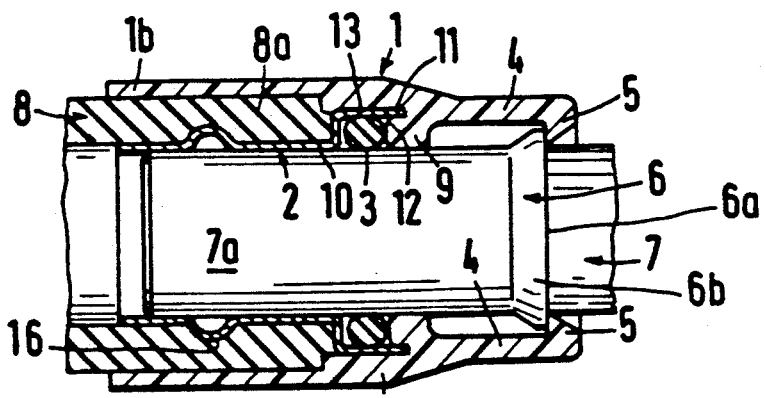
FIG. 1 is an axial sectional view of a fully assembled coupling device which establishes a separable sealing connection between the terminal portion of a first component in the form of a pipe or tube and the terminal portion of a second component in the form of a flexible hose.

The drawing shows a coupling device which can be utilized with advantage as a hose coupling. For example, the improved coupling device can establish a separable sealing connection between the terminal portion 7a of a first tubular component (e.g., between the nipple of a metallic or plastic pipe or tube) and the terminal portion 8a of a second tubular component 8 (e.g., one end portion of a flexible elastically deformable hose of rubber or plastic material). The illustrated coupling device is assembled of three discrete parts, namely a tubular connector 1 which is made of a suitable plastic material, e.g., an at least slightly elastic material, an elongated thin-walled metallic sleeve 2 which is preferably made of a ductile material, and an annular sealing element 3, e.g., an O-ring.

The connector 1 comprises a first portion 1a which is provided with an annular internal wall 9 and an annular internal protuberance 10 in the form of a circumferentially complete bead, and a cylindrical second portion 1b which can receive the terminal portion 8a of the hose 8. The protuberance 10 is disposed between the wall 9 and the second portion 1b, and the first portion 1a can receive the terminal portion 7a of the pipe 7. The illustrated terminal portion 7a of the pipe 7 is sufficiently long to extend well beyond the first portion 1a and practically to the free end of the second portion 1b of the connector 1 when the coupling device is properly assembled (see FIG. 1).

The first portion 1a of the connector 1 further comprises at least one elongated elastically deformable extension or arm 4 which extends in parallelism with the axis of the connector in a direction away from the second portion 1b and the free end of which is provided with a radially inwardly extending pallet 5 in the form of a tooth having a conical front flank 5a and a substantially radially extending rear flank 5b. The latter can engage the radially extending shoulder 6a of an external retainer 6 which is provided on the pipe 7 adjacent the inner end of the terminal portion 7a. The illustrated connector 1 includes a first portion 1a having two extensions or arms 4 which are located diametrically opposite each other with reference to the central longitudinal axis of the connector. The shoulder 6a faces away from the terminal portion 7a. It is clear that the number of extensions or arms 4 can be reduced to one or increased to three or more without departing from the spirit of the invention. The purpose of the conical front flanks 5a on the pallets 5 of the arms 4 is to enable the pallets 5 to ride over the conical front side 6b of the retainer 6 during insertion of the terminal portion 7a into the connector 1.

The radially outermost portion of the annular internal wall 9 of the first portion 1a of the connector 1 is provided with an annular groove or socket 11 having an open end which faces toward the second portion 1b of the connector 1. Such open end surrounds a conical guide face 12 which diverges toward the axis of the connector in a direction toward the protuberance 10 and the second portion 1b of the connector. The purpose of the socket 11 is to sealingly receive the free end of a larger-diameter (second) section 13 of the sleeve 2 which latter further comprises a smaller-diameter (first) section 13a defining with the larger-diameter section 13 an annular shoulder 13b at a predetermined axial distance from the free end of the section 13. Such free end is formed with a conical external surface 14 which converges toward the axis of the sleeve 2 and serves to facilitate introduction of the free end of the section 13 into the protuberance 10. The inner diameter of the protuberance 10 (in undeformed condition of the first portion 1a of the connector 1) is somewhat smaller than the outer diameter of the second section 13 of the sleeve 2 so that the sleeve 2 and/or the connector 1 must undergo a certain amount of deformation during introduction of the sleeve into the connector in such a way that the section 13 enters by way of the open end of the second portion 1b and is thereupon moved axially toward the socket 11 of the wall 9. As can be best seen in FIG. 2, the distance of the shoulder 13b from the free end of the section 13 is such that, when the free end of the section 13 is properly received in the socket 11, the shoulder 13b is located between the protuberance 10 and the wall 9. Thus, the protuberance 10 must be deformed (expanded) during introduction of the free end of the section 13 into the socket 11 as well as during withdrawal or extraction of the section 13 from the first portion 1a of the connector 1 but the protuberance 10 need not be deformed (expanded) at all or need not be expanded by the sleeve 2 in fully assembled condition of the improved coupling device.

The extensions or arms 4 are integral with that part of the first portion 1a of the connector 1 which includes the annular internal wall 9.

If the material of the sleeve 2 exhibits a certain amount of elasticity, the section 13 begins to undergo a certain amount of (radially inward) deformation when its conical external surface 14 enters the protuberance 10 and the sleeve continues to advance toward and into the socket 11, and such radially inward deformation is eliminated by the conical guide face 12 during advancement of the free end of the section 13 into the socket 11. The expanding action of the guide face 12 is particularly important if the sleeve 2 is made of a pronouncedly ductile material, i.e., so that its innate elasticity (if any) does not suffice to increase the diameter of the free end of the section 13 subsequent to radially inward deformation of such free end by the internal surface of the annular protuberance 10.

When the section 13 of the sleeve 2 is properly received in the connector 1, these parts define an annular compartment 15 which is surrounded by the section 13 and is disposed between the wall 9 on the one hand and the protuberance 10 and shoulder 13b on the other hand. The compartment 15 receives the sealing element 3 and the latter is deformed to sealingly engage the external surface of the terminal portion 7a and the internal surface of the section 13 and/or the shoulder 13b and/or the wall 9 in order to ensure the establishment of a barrier to the outflow of a fluid from the terminal portion 7a and/or 8a along the internal surface of the portion 1a when the coupling device is properly assembled with the pipe 7 and with the hose 8.

In order to assemble the coupling device, the section 13 of the sleeve 2 is introduced into the first portion 1a of the connector 1 by way of the second portion 1b while the O-ring 3 is located adjacent the wall 9, i.e., between the wall 9 and the internal protuberance 13 of the first portion 1a. Insertion of the sleeve 2 is completed when the free end of the second section 13 is properly received in the socket 11. The next step involves insertion of the terminal portion 8a of the hose 8 into the annular space between the second portion 1b of the connector 1 and the first section 13a of the sleeve 2 until the terminal portion 8a reaches and abuts the shoulder 13b. This step is followed by the step of deforming the section 13a of the sleeve 2 from within, e.g., with one or more rollers (not shown), so as to provide the section 13a with one or more corrugations 16 which sealingly engage the internal surface of the terminal portion 8a and urge the external surface of the terminal portion 8a into sealing engagement with the internal surface of the portion 1b. The thus assembled parts 1, 2, 3 and 8 are then assembled with the pipe 7 by causing the terminal portion 7a to enter the first portion 1a of the connector 1 whereby the pallets 5 of the extensions or arms 4 slide along the external surface of the terminal portion 7a and thereupon ride along the conical flank 6b prior to snapping behind the shoulder 6a of the retainer 6 to thus complete the assembly of the improved coupling device with the components 7 and 8 (see FIG. 1).

Figure 2:
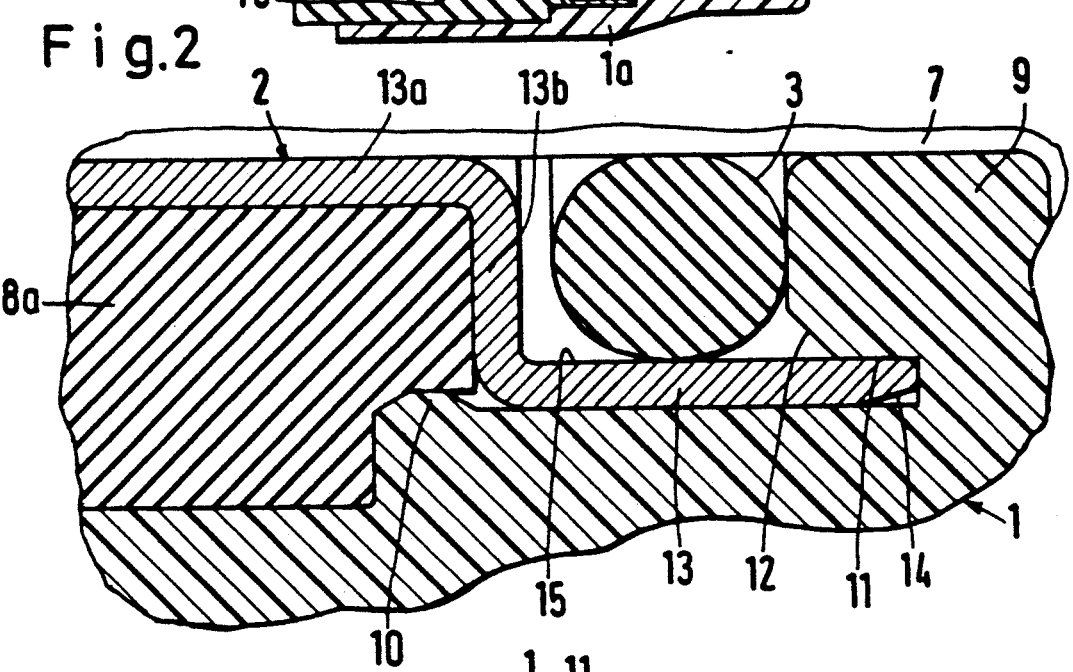
FIG. 2 is an enlarged view of a detail in the coupling device of FIG. 1.

As mentioned above, the shoulder 13b is preferably located between the internal wall 9 and the internal protuberance 10 of the first portion 1a of the connector 1 when the latter is properly assembled with the sleeve 2, i.e., when the free end of the second section 13 of the sleeve is received in the socket 11 of the wall 9. This ensures that a person wishing to separate the terminal portion 8a of the hose 8 from the second portion 1b of the connector 1 and first section 13a of the sleeve 2 must exert a pronounced force in a direction to extract the terminal portion 8a from the annular space between the section 13a and the portion 1b. Such extraction is opposed by the corrugation or corrugations 16. As a rule, the terminal portion 8a will be separated from the second portion 1b of the connector 1 jointly with the sleeve 2; the force which is required to separate the hose 8 and the sleeve 2 from the connector 1 must suffice to overcome the resistance of the protuberance 10, i.e., the second section 13 of the sleeve 2 must be caused to contract and/or the protuberance 10 must be deformed radially outwardly in order to enable the section 13 to advance within and beyond the protuberance 10 in a direction to the left as seen in FIG. 1 or 2.

It has been found that the provision of one or more corrugations 16 in the section 13a of the sleeve 2 is amply sufficient to prevent separation of the hose 8 from the sleeve in response to the exertion of very large axially oriented forces, as well as that the connection between the terminal portion 8a on the one hand and the section 13a and portion 1b on the one hand reliably prevents leakage of confined fluid even if the pressure of fluid flowing from the terminal portion 7a into the terminal portion 8a or in the opposite direction is extremely high.

The coupling device and the hose 8 can be separated from the pipe 7 by the simple expedient of disengaging the radial flanks 5b of the pallets 5 from the shoulder 6a of the retainer 6 preparatory to extraction of the terminal portion 7a from the connector 1 and sleeve 2. Disengagement of the pallets 5 from the retainer 6 can be effected by resorting to any one of a variety of rudimentary tools.

Figure 3:
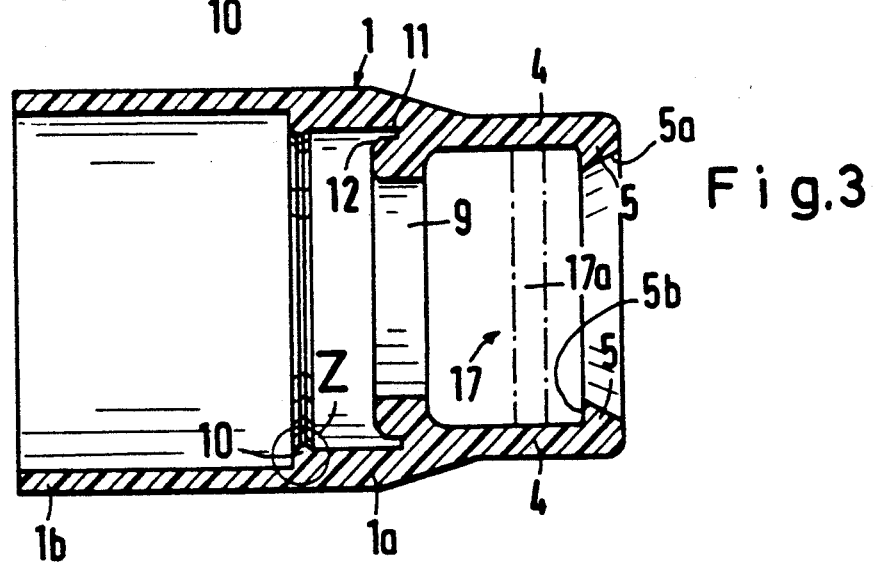
FIG. 3 is an axial sectional view of the connector which forms part of the coupling device of FIG. 1.
Figure 4:
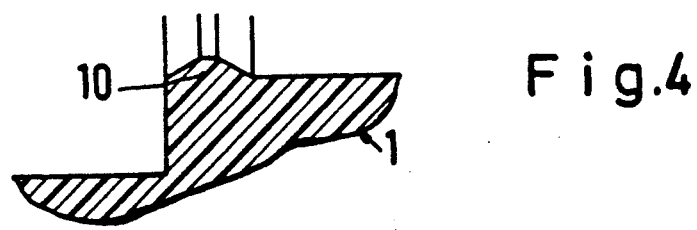
FIG. 4 is an enlarged view of a detail within the circle Z in FIG. 3.

Furthermore, the coupling device can be equipped with disengaging means to facilitate separation of the pallets 5 from the retainer 6. For example, the arms or extensions 4 can be made integral with an oval disengaging ring of deformable plastic material. A portion of such disengaging ring is indicated in FIG. 3 by phantom lines, as at 17. The major axis of the ring 17 (in undeformed condition of the ring) extends at right angles to the plane of FIG. 3. If this ring is deformed by pressing its median portions 17a toward the plane of FIG. 3, the arms 4 are caused to move their pallets 5 away from each other to thus disengage the flanks 5b from the shoulder 6a of the retainer 6. The terminal portion 7a of the pipe 7 is then ready for extraction from the connector 1 and sleeve 2.

The disengaging ring 17 of FIG. 3 (which is integral with the arms 4) can be replaced with a preferably oval discrete disengaging ring (not shown) which surrounds the properly inserted terminal portion 7a between the pallets 5 and the wall 9 and has suitably configured internal and/or external lobes which disengage the pallets 5 from the retainer 6 when the discrete ring is shifted along the terminal portion from the wall 9 toward (and, if necessary, onto the conical flank 6b of) the retainer 6. If the discrete ring is oval, it can be deformed radially in the same way as the ring 17 to thereby cause the arms 4 to disengage their pallets 5 from the shoulder 6a of the retainer 6.

An important advantage of the improved coupling device is that the sleeve 2 and the terminal portion 8a of the hose 8 can be introduced into the connector 1 through one and the same portion (1b) of the connector. Furthermore, the protuberance 10 cooperates with the shoulder 13b of the properly inserted sleeve 2 to prevent unintentional separation of the sleeve from the connector 1. At the same time, the section 13a (and more particularly the deformed portion 16 of the section 13) cooperates with the portion 1b of the connector 1 to reliably prevent accidental extraction of the terminal portion 8a from the annular space between the portion 1b and the section 13a. The extent to which the protuberance 10 and/or the section 13 must be deformed in order to introduce the free end of the section 13 into the socket 11 or to extract the section 13 into the portion 1b of the connector 1 need not be very pronounced, as long as the retaining or confining action of the protuberance 10 suffices to resist anticipated forces which would tend to disengage the sleeve 2 from the connector 1.

The arms 4 and their pallets 5 need not extend radially outwardly beyond the external surfaces of portions 1a, 1b of the connector 1. This is often desirable and advantageous because it contributes to compactness of the connector 1 and hence to compactness of the entire coupling device. The length of the terminal portion 7a of the pipe 7 should suffice to ensure that this terminal portion is sealingly engaged by the deformed O-ring 3 when the pallets 5 engage the shoulder 6a of the retainer 6. However, and as shown in FIG. 1, the terminal portion 7a can be much longer, i.e., it can extend beyond the O-ring 3 well into and close to the free end of the section 13a. The outer diameter of the connector 1 need not appreciably exceed the outer diameter of the pipe 7 and of its terminal portion 7a. The open end of the terminal portion 7a is totally unobstructed so that it permits free flow of a fluid medium between the axial passages of the terminal portions 7a and 8a.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A device for separably coupling a terminal portion of a first tubular component with a terminal portion of a second tubular component, particularly with a deformable hose, comprising a tubular connector having a first portion for reception of the terminal connector of the first component and a second portion for reception of the terminal portion of the second component, said first portion having an annular internal wall arranged to surround the terminal portion of the first component and provided with an annular socket having an open end facing said second portion; a sleeve including a first section having a first diameter and being receivable in the terminal portion of the second component and a second section having a second diameter larger than said first diameter and a free end receivable in said socket after having passed through said second portion, said connector and said sleeve defining an annular compartment which is surrounded by said second section and is adjacent said wall when said free end of said second section is received in said socket; and at least one annular sealing element receivable in said compartment to sealingly engage one of said sleeve and said wall as well as the terminal portion of the first component when the terminal portion of the first component is received in said connector.

2. The device of claim 1, wherein said first portion has an annular internal protuberance which is spaced apart from the open end of said socket in a direction toward said second portion and has a predetermined inner diameter, said second section having an outer diameter greater than said inner diameter so that one of said protuberance and said second section undergoes deformation during introduction of the free end of said second section into said socket.

3. The device of claim 2, wherein said sections define a shoulder which is located between said protuberance and said wall when the free end of said second section is received in said socket.

4. The device of claim 2, wherein at least the first portion of said connector consists of an elastomeric material.

5. The device of claim 2, wherein at least the first section of said sleeve consists of a ductile material so that the first section is deformable from within upon reception in the terminal portion of the second component.

6. The device of claim 2, wherein said wall has a conical guide face at the open end of said socket to facilitate introduction of the free end of said second section into said socket.

7. The device of claim 6, wherein said free end of said second section has a conical external surface which rides over said protuberance during the initial stage of advancement of said second section through said protuberance in a direction to advance said free end toward and into said socket.

8. The device of claim 1 for separably coupling first and second tubular components wherein the first component has an external retainer, said first portion having at least one flexible arm which engages the retainer when the terminal portion of the first component is received in said connector.

9. The device of claim 8 for separably coupling first and second tubular components wherein the external retainer of the first component has a shoulder facing away from the terminal portion of the first component, said at least one flexible arm of said first portion extending in a direction away from said second portion and having an inwardly extending pallet which engages the shoulder of the retainer upon completed reception of the terminal portion of the first component in said connector.

10. The device of claim 8, further comprising means for disengaging said at least one arm from the retainer of the first component preparatory to withdrawal of the first component from said connector.

* * * * *